(12) United States Patent
Esaka et al.

(10) Patent No.: US 7,516,726 B2
(45) Date of Patent: Apr. 14, 2009

(54) BATTERY DEVICE, INTERNAL COMBUSTION ENGINE SYSTEM INCLUDING BATTERY DEVICE, AND MOTOR VEHICLE EQUIPPED WITH INTERNAL COMBUSTION ENGINE SYSTEM

(75) Inventors: Toshinori Esaka, Nishikamo-gun (JP); Nobuyuki Okabe, Toyota (JP); Osamu Komeda, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 307 days.

(21) Appl. No.: 11/632,128

(22) PCT Filed: Apr. 14, 2006

(86) PCT No.: PCT/JP2006/308363
§ 371 (c)(1),
(2), (4) Date: Jan. 11, 2007

(87) PCT Pub. No.: WO2006/112512
PCT Pub. Date: Oct. 26, 2006

(65) Prior Publication Data
US 2008/0072859 A1 Mar. 27, 2008

(30) Foreign Application Priority Data
Apr. 15, 2005 (JP) ............................. 2005-118207

(51) Int. Cl.
*F02N 11/08* (2006.01)
*F02N 17/08* (2006.01)
*H02J 7/14* (2006.01)
*H02J 7/00* (2006.01)

(52) U.S. Cl. .................................. 123/179.3; 320/117

(58) Field of Classification Search ............. 123/179.3; 320/117, 120, 118
See application file for complete search history.

(56) References Cited

U.S. PATENT DOCUMENTS
5,814,970 A * 9/1998 Schmidt ...................... 320/118
(Continued)

FOREIGN PATENT DOCUMENTS
JP   A 8-205312   8/1996
(Continued)

*Primary Examiner*—Stephen K Cronin
*Assistant Examiner*—Arnold Castro
(74) *Attorney, Agent, or Firm*—Oliff & Berridge, PLC

(57) ABSTRACT

A battery device of the invention has a high-voltage battery unit, which includes three battery modules C1 through C3, three voltage equalization circuits B1 through B3, and six switches SW1 through SW6. Each of the three battery modules C1 through C3 includes plural lithium secondary cells arranged in series. Each of the voltage equalization circuits B1 through B3 works to equalize the voltages of the respective cells included in a corresponding one of the battery modules C1 through C3. The six switches SW1 through SW6 are individually switched on and off to switch over the connection state of the battery modules C1 through C3 between serial connection and parallel connection. In the battery device of the invention, the voltage equalization process activates the voltage equalization circuits B1 through B3 to respectively equalize the voltages of the plural cells included in each of the three battery modules C1 through C3 in the state of serial connection of the battery modules C1 through C3. After completion of the voltage equalization in each of the three battery modules C1 through C3, the voltage equalization process connects the three battery modules C1 through C3 in parallel and equalizes the voltages of the respective battery modules C1 through C3. This arrangement effectively reduces the power loss by the voltage equalization and thus enhances the total energy efficiency of the whole battery device.

11 Claims, 5 Drawing Sheets

U.S. PATENT DOCUMENTS

| | | |
|---|---|---|
| 6,034,506 A | 3/2000 | Hall |
| 6,064,178 A | 5/2000 | Miller |
| 6,140,799 A * | 10/2000 | Thomasson ............ 320/117 |
| 6,430,692 B1 | 8/2002 | Kimble et al. |
| 6,674,180 B2 * | 1/2004 | Gale et al. ............ 320/117 |
| 7,009,363 B2 * | 3/2006 | Beals et al. ............ 320/117 |

FOREIGN PATENT DOCUMENTS

| | | |
|---|---|---|
| JP | A 2004-31012 | 1/2004 |
| JP | A 2004-31013 | 1/2004 |

* cited by examiner

BATTERY DEVICE, INTERNAL COMBUSTION ENGINE SYSTEM INCLUDING BATTERY DEVICE, AND MOTOR VEHICLE EQUIPPED WITH INTERNAL COMBUSTION ENGINE SYSTEM

TECHNICAL FIELD

The present invention relates to a battery device, an internal combustion engine system including the battery device, and a motor vehicle equipped with the internal combustion engine system. More specifically the invention pertains to a battery device including multiple battery modules, where each battery module has plural cells connected in series, as well as to an internal combustion engine system including such a battery device and a motor vehicle equipped with such an internal combustion engine system.

BACKGROUND ART

One proposed battery device determines a voltage adjustment condition of plural cells, which are arranged in series to construct a battery assembly, according to the charge levels or the states of charge SOC of the respective cells, and actually adjusts the voltages of the respective cells in the battery assembly on the basis of the determined voltage adjustment condition (see, for example, Japanese Patent Laid-Open Gazette No. 2004-31012). Such voltage adjustment equalizes the voltages of the respective cells in the battery assembly.

DISCLOSURE OF THE INVENTION

The prior art battery device discharges the respective cells to equalize the voltages of the respective cells. The voltage equalization thus causes a significant power loss. The power loss undesirably lowers the total energy efficiency, so that reduction of the power loss is highly demanded.

In an internal combustion engine system that actuates a starter motor to crank and start an internal combustion engine, the internal combustion engine fails to start in the event of a dead secondary battery that supplies a required electric power to the starter motor. The internal combustion engine system thus demands an additional power supply source other than the secondary battery to ensure a supply of the required electric power to the starter motor.

The battery device of the invention thus aims to reduce the power loss by voltage equalization of respective cells. The internal combustion engine system and the motor vehicle equipped with the internal combustion engine system aim to ensure supply of a required electric power to a starter motor to start an internal combustion engine even in the event that a secondary battery is dead and fails to supply the required electric power to the starter motor.

In order to attain at least part of the above and the other related objects, the battery device of the invention, the internal combustion engine system including the battery device, and the motor vehicle equipped with the internal combustion engine system have the configurations discussed below.

The present invention is directed to a battery device that includes multiple battery modules, where each of the multiple battery modules has plural cells connected in series. The battery device further includes: multiple voltage equalization circuits that are provided corresponding to the multiple battery modules and respectively equalize voltages of the plural cells included in each of the multiple battery modules; a connection switchover structure that switches over a connection state of the multiple battery modules between serial connection and parallel connection; and a voltage equalization control module that, upon satisfaction of a predetermined voltage equalization condition, controls the connection switchover structure and the multiple voltage equalization circuits to respectively equalize voltages of the plural cells included in each of the multiple battery modules in the state of serial connection of the multiple battery modules, and on completion of the voltage equalization of the respective cells in each of the multiple battery modules, controls the connection switchover structure and the multiple voltage equalization circuits to connect the multiple battery modules in parallel and equalize voltages of the respective battery modules.

Upon satisfaction of the predetermined voltage equalization condition, the battery device of the invention equalizes the voltages of the plural cells included in each of the multiple battery modules in the state of serial connection of the multiple battery modules. On completion of the voltage equalization of the plural cells in each battery module, the battery device connects the multiple battery modules in parallel and equalizes the voltages of the respective battery modules. The voltage equalization of the plural cells in each of the multiple battery modules arranged in series causes a power loss due to discharging. The voltage equalization of the multiple battery modules in the state of parallel connection enables the transfer of electric power between the respective battery modules and accordingly does not cause a power loss due to discharging. This arrangement effectively reduces the total power loss. The plural cells included in each of the multiple battery modules may be lithium secondary cells.

In the battery device of the invention, the connection switchover structure may switch over a connection state of plural series battery module groups between serial connection and parallel connection, where each series battery module group includes a predetermined number of the battery modules arranged in series.

The present invention is directed to an internal combustion engine system that includes an internal combustion engine. The internal combustion engine system further includes: a starter motor that cranks the internal combustion engine; a secondary battery that supplies electric power to the starter motor; a battery device that includes multiple battery modules, where each of the multiple battery modules has plural cells connected in series, said battery device comprising: multiple voltage equalization circuits that are provided correspondingly to the multiple battery modules and respectively equalize voltages of the plural cells included in each of the multiple battery modules; a connection switchover structure that switches over a connection state of the multiple battery modules between serial connection and parallel connection; and a voltage equalization control module that, upon satisfaction of a predetermined voltage equalization condition, controls the connection switchover structure and the multiple voltage equalization circuits to respectively equalize voltages of the plural cells included in each of the multiple battery modules in the state of serial connection of the multiple battery modules, and on completion of the voltage equalization of the respective cells in each of the multiple battery modules, controls the connection switchover structure and the multiple voltage equalization circuits to connect the multiple battery modules in parallel and equalize voltages of the respective battery modules; an electric power supply-stop changeover module that selectively permits and prohibits supply of electric power from said battery device to the starter motor; and a changeover control module that, upon satisfaction of a preset changeover condition, controls the connection switchover structure of said battery device and said electric power supply-stop changeover module to permit the supply of electric power from said battery device to the starter motor in the state of parallel connection of the multiple battery modules.

Upon satisfaction of the preset changeover condition, the internal combustion engine system of the invention permits the supply of electric power from the battery device to the starter motor in the state of parallel connection of the multiple battery modules. The internal combustion engine system accordingly uses both the secondary battery and the battery device as the power supply sources to supply the required electric power to the starter motor. Even in the state where the secondary battery is dead and fails to supply the required electric power to the starter motor for cranking the internal combustion engine, the starter motor is drivable with the supply of electric power from the battery device to crank and start the internal combustion engine. The preset changeover condition is, for example, that the secondary battery fails to supply a required electric power to the starter motor for cranking the internal combustion engine. The internal combustion engine system of the invention may be mounted on a vehicle, for example, an automobile.

BEST MODES OF CARRYING OUT THE INVENTION

Figure 1:
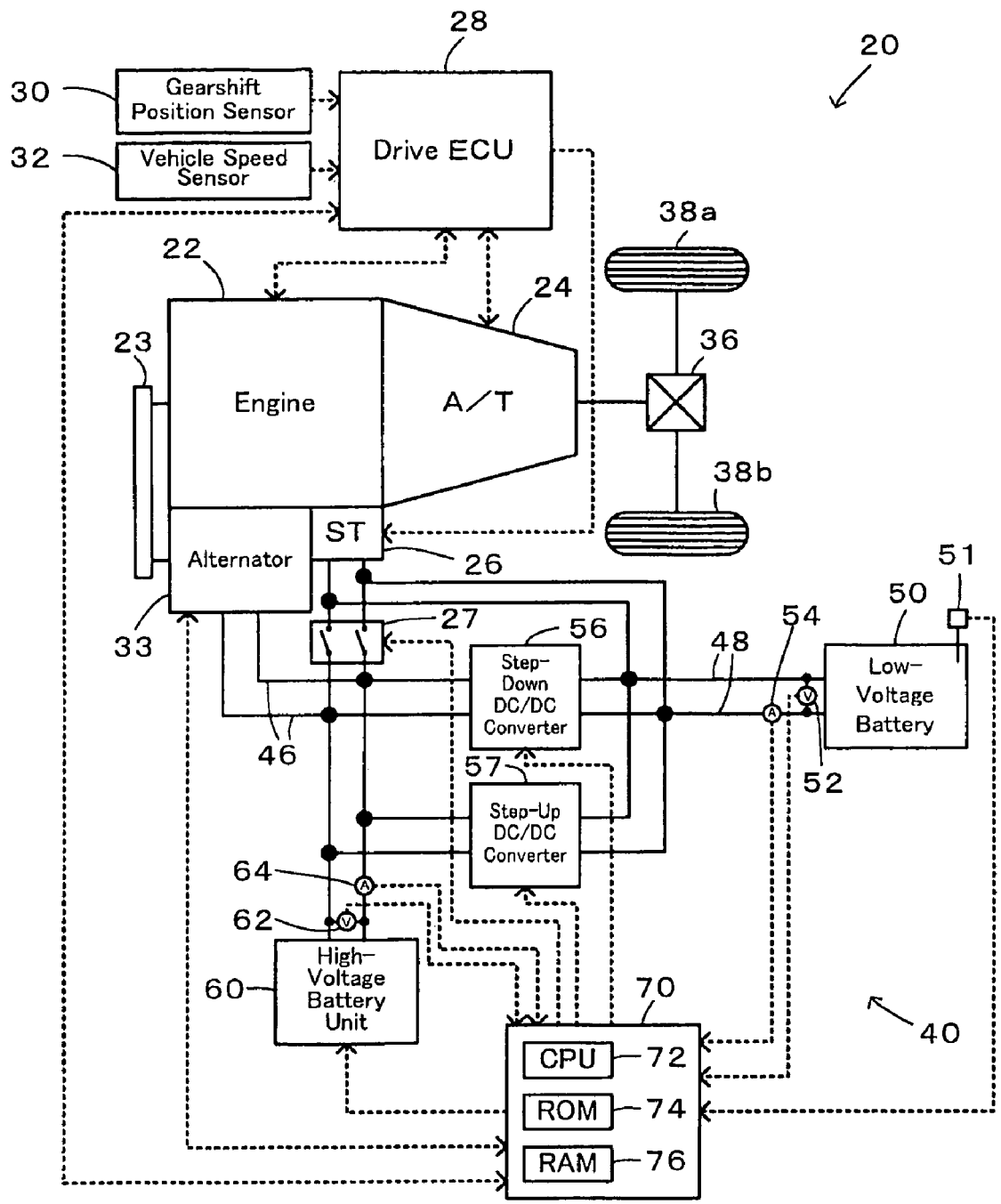
FIG. 1 schematically illustrates the configuration of a motor vehicle equipped with a power supply device as a battery device in one embodiment of the invention.

One mode of carrying out the invention is discussed below as a preferred embodiment with reference to accompanied drawings. FIG. 1 schematically illustrates the configuration of a motor vehicle 20 equipped with a power supply device 40 as a battery device in one embodiment of the invention. As illustrated in FIG. 1, the motor vehicle 20 of the embodiment includes an engine 22 that consumes gasoline as a fuel to output power, and an automatic transmission 24 that converts the output power of the engine 22 at one of multiple gear ratios and outputs the converted power to drive wheels 38a and 38b via a differential gear 36. The motor vehicle 20 of the embodiment also has a drive electronic control unit 28 (drive ECU 28) that controls the operations of the engine 22 and the automatic transmission 24, an alternator 33 that has a rotating shaft connected to a crankshaft of the engine 22 via a belt 23 and consumes the output power of the engine 22 to generate electric power, and the power supply device 40.

The drive ECU 28 is constructed as a microcomputer including a CPU, an input port, and an output port, which are not specifically illustrated in FIG. 1. The drive ECU 28 receives, via its input port, data required for controlling the operations of the engine 22 and the automatic transmission 24 from various sensors attached to the engine 22 and the automatic transmission 24. The input data include, for example, a gearshift position SP from a gearshift position sensor 30 and a vehicle speed from a vehicle speed sensor 32. The drive ECU 28 outputs, via its output port, diverse driving signals and control signals, for example, driving signals to a starter motor 26 for cranking the engine 22 and driving signals to various actuators in the engine 22 and the automatic transmission 24.

The power supply device 40 includes a high-voltage battery unit 60, a low-voltage battery 50, and a power supply electronic control unit 70 that controls the operations of the whole power supply device 40. The high-voltage battery unit 60 is connected with the alternator 33 via high-voltage power lines 46 to be charged with the electric power generated by the alternator 33 and supplies electric power to the starter motor 26 via a relay 27. The low-voltage battery 50 is connected to the high-voltage power lines 46 via a step-down DC-DC converter 56 and a step-up DC-DC converter 57 and supplies electric power to the starter motor 26 and other auxiliary machinery via low-voltage power lines 48. In the structure of the embodiment, the low-voltage battery 50 is a lead acid battery having a rated output voltage of 12 V.

Figure 2:
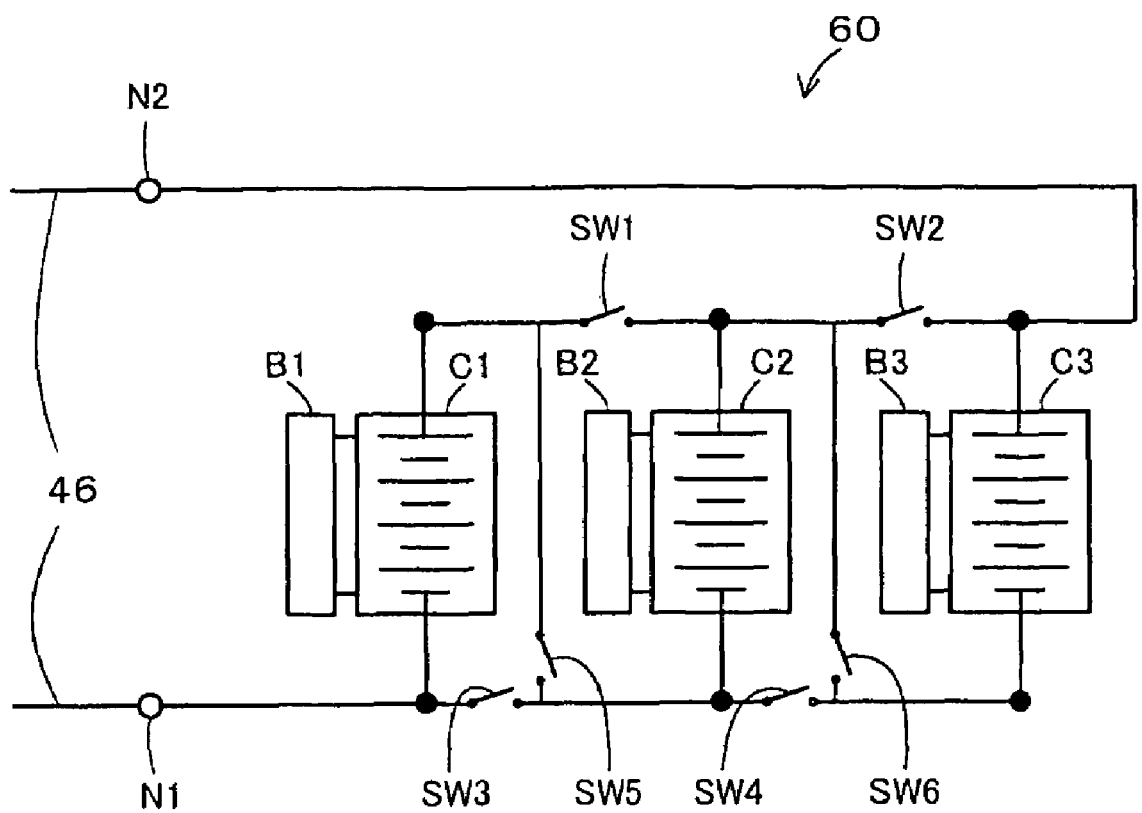
FIG. 2 schematically shows the structure of a high-voltage battery unit included in the power supply device of FIG. 1.

As shown in FIG. 2, the high-voltage battery unit 60 includes three battery modules C1 through C3, three voltage equalization circuits B1 through B3, and multiple switches SW1 through SW6. Each of the three battery modules C1 through C3 includes plural lithium secondary cells arranged in series. Each of the voltage equalization circuits B1 through B3 works to equalize the voltages of the respective cells included in a corresponding one of the battery modules C1 through C3. The multiple switches SW1 through SW6 are individually switched on and off to switch over the connection state of the battery modules C1 through C3 between serial connection and parallel connection. Each of the battery modules C1 through C3 is designed to have an output voltage equivalent to the rated output voltage '12 V' of the low-voltage battery 50. Each of the voltage equalization circuits B1 through B3 has a resistance, lead wires connected to electrodes of the respective cells, and multiple switches that respectively connect the lead wires from the respective cells to the resistance, although not being specifically illustrated. Each voltage equalization circuit B1, B2, or B3 sequentially connects the plural cells included in the corresponding battery module C1, C2, or C3 to the resistance and discharges the respective cells to equalize the varying voltages of the respective cells to a lowest voltage level of a lowest-voltage cell among the respective cells in the battery module C1, C2, or C3. The structures and the operations of the voltage equalization circuits B1 through B3 are known in the art and are not characteristic of the present invention, thus not being specifically described in detail. In the high-voltage battery unit 60, the OFF settings of the switches SW1 through SW4 and the ON settings of the switches SW5 and SW6 attain the serial connection of the battery modules C1 through C3. The battery modules C1 through C3 connected in series work as a battery of a rated output voltage that is 3-fold the rated output voltage (12 V) of the low-voltage battery 50 and have input and output terminals N1 and N2 linked to the high-voltage power lines 46. The ON settings of the switches SW1 through SW4 and the OFF settings of the switches SW5 and SW6, on the other hand, attain the parallel connection of the battery modules C1 through C3. The battery modules C1 through C3 connected in parallel work as a battery of a rated output voltage that is equal to the rated output voltage (12 V) of the low-voltage battery 50 and have the input and output terminals N1 and N2 linked to the high-voltage power lines 46.

The power supply electronic control unit 70 is Constructed as a microcomputer including a CPU 72, a ROM 74 that stores processing programs, a RAM 76 that temporarily stores data, and input and output ports (not shown), and a communication port (not shown). The power supply electronic control unit 70 receives, via its input port, diverse data required for control, for example, an alternator temperature Ta from a temperature sensor (not shown) attached to the alternator 33, an alternator rotation speed Na from a rotation speed sensor (not shown) attached to the alternator 33, a low-voltage battery temperature Tb1 from a temperature sensor 51 attached to the low-voltage battery 50, a low-voltage battery voltage Vb1 from a voltage sensor 52 arranged between output terminals of the low-voltage battery 50, a low-voltage battery electric current Ib1 from an electric current sensor 54 located on the power line 46 in the vicinity of the output terminals of the low-voltage battery 50, a high-voltage battery voltage Vb2 from a voltage sensor 62 arranged between output terminals of the high-voltage battery unit 60, and a high-voltage battery electric current Ib2 from an electric current sensor 64 located on the power line 46 in the vicinity of the output terminals of the high-voltage battery unit 60. The power supply electronic control unit 70 outputs, via its output port, driving signals to the alternator 33, control signals to the step-down DC-DC converter 56, and control signals to the step-up DC-DC converter 57. The power supply electronic control unit 70 establishes communication with the drive ECU 28 to send and receive data to and from the drive ECU 28 according to the requirements. The high-voltage battery unit 60 and the power supply electronic control unit 70 of the embodiment correspond to the battery device of the invention.

Figure 3:
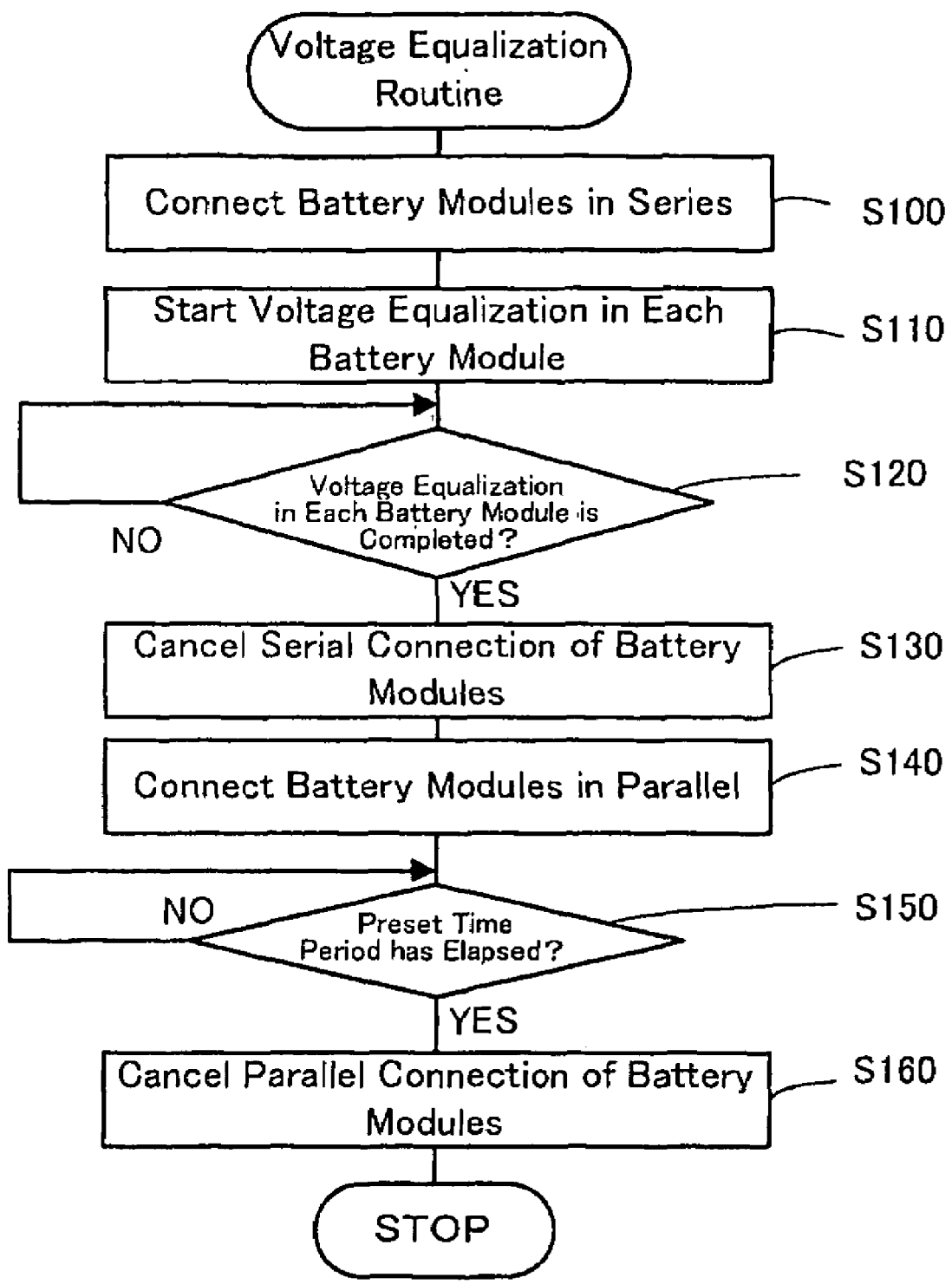
FIG. 3 is a flowchart showing a voltage equalization routine executed by a power supply electronic control unit included in the power supply device of FIG. 1.

The power supply device 40 of the embodiment constructed as discussed above performs some characteristic operations, especially a series of control to equalize the voltages of the respective cells included in the battery modules C1 through C3 and a series of engine start control to actuate the starter motor 26 with a supply of electric power from the high-voltage battery unit 60 and start the engine 22. The description first regards the voltage equalization to equalize the voltages of the respective cells in the battery modules C1 through C3. FIG. 3 is a flowchart showing a voltage equalization routine executed by the power supply electronic control unit 70 in the state of ignition-off. This voltage equalization routine is triggered in a state of unequal voltages of the respective cells included in the battery modules C1 through C3.

In the voltage equalization routine of FIG. 3, the CPU 72 of the power supply electronic control unit 70 sets the switches SW1 through SW4 in the OFF position and the switches SW5 and SW6 in the ON position to connect the battery modules C1 through C3 in series (step S100) and activates the voltage equalization circuits B1 through B3 to individually start equalization of the voltages of the respective cells included in the corresponding battery modules C1 through C3 (step S110). The CPU 72 waits until completion of the equalization of the voltages of the respective cells included in each of the battery modules C1 through C3 (step S120).

On completion of the equalization of the voltages of the respective cells in each of the battery modules C1 through C3, the CPU 72 sets the switches SW5 and SW6 in the OFF position to cancel the serial connection of the battery modules C1 through C3 (step S130). The CPU 72 then sets the switches SW1 through SW4 in the ON position and keeps the switches SW5 and SW6 in the OFF position to connect the battery modules C1 through C3 in parallel (step S140). After elapse of a preset time period (step S150), the CPU 72 sets the switches SW1 through SW4 in the OFF position to cancel the parallel connection of the battery modules C1 through C3 (step S160). The voltage equalization routine is terminated after the cancellation of the parallel connection. The voltage equalization equalizes the varying voltages of the plural cells included in each battery module C1, C2, or C3 to a lowest voltage level of a lowest-voltage cell among the respective cells in the battery module C1, C2, or C3. This voltage equalization, however, does not equalize the voltages of the three battery modules C1 through C3 but leaves the uneven voltages of the respective battery modules C1 through C3. The parallel connection of the battery modules C1 through C3 enables transfer of the electric power between the different battery modules C1 through C3 and accordingly equalizes the voltages of the respective battery modules C1 through C3. Some battery modules require charging for the voltage equalization, while the other battery modules require discharging for the voltage equalization. This ensures a relatively small voltage loss. A conventional voltage equalization process equalizes the voltages of all the cells included in the battery modules C1 through C3 to a lowest voltage level of a lowest-voltage cell among all the cells. This voltage equalization process does not cause a voltage difference among the battery modules C1 through C3, but requires only discharging of all the battery modules C1 through C3 for the voltage equalization. The conventional voltage equalization process accordingly has a greater voltage loss, compared with the voltage equalization process of the embodiment that equalizes the voltages of the respective cells in each of multiple battery modules and connects the multiple battery modules in parallel to equalize the voltages of the respective battery modules. Namely the voltage equalization process of this embodiment desirably reduces the voltage loss through the transfer of electric power between the different battery modules.

The description regards the engine start control to actuate the starter motor 26 with a supply of electric power from the high-voltage battery unit 60 and start the engine 22. This engine start control is performed in the event that the supply of electric power from the low-voltage battery 50 fails to actuate the starter motor 26 and start the engine 22, for example, in the event of the dead low-voltage battery 50, and follows a backup start control routine of FIG. 4.

Figure 4:
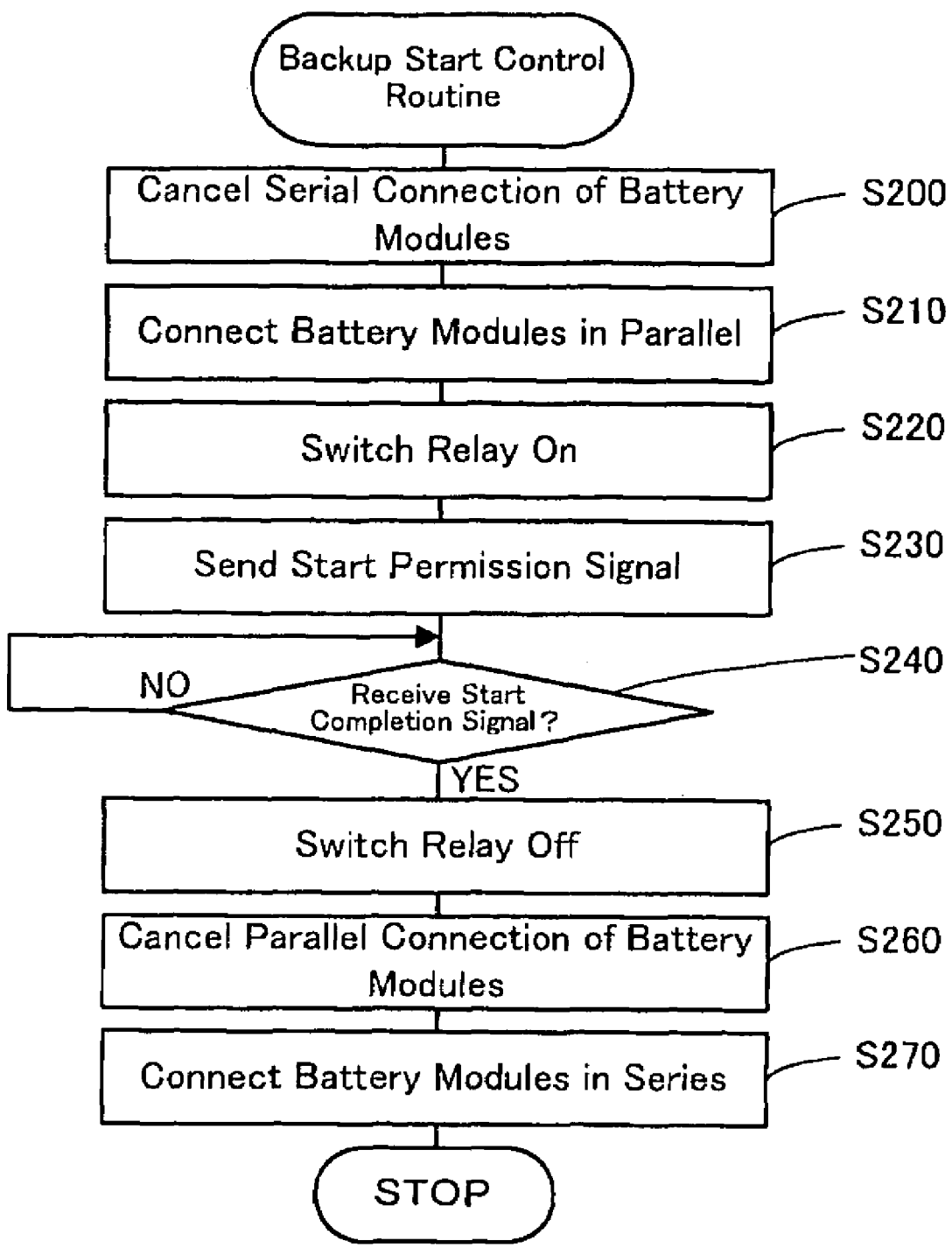
FIG. 4 is a flowchart showing a backup start control routine executed by the power supply electronic control unit.

In the backup start control routine of FIG. 4, the CPU 72 of the power supply electronic control unit 70 first sets the switches SW5 and SW6 in the OFF position to cancel the serial connection of the battery modules C1 through C3 (step S200) and subsequently sets the switches SW1 through SW4 in the ON position to connect the battery modules C1 through C3 in parallel (step S210). The CPU 72 then switches on the relay 27 (step S220) and sends a start permission signal of the engine 22 to the drive ECU 28 (step S230). The output voltage of the high-voltage battery unit 60 in the parallel connection of the battery modules C1 through C3 is equal to the rated output voltage of the low-voltage battery 50 as mentioned previously. The supplied electric power from the high-voltage battery unit 60 to the starter motor 26 in this state is accordingly not an excessive level of electric power. The drive ECU 28 receives the start permission signal and drives the starter motor 26 in response to an ignition-on operation to crank and start the engine 22. Upon a complete start of the engine 22, the drive ECU 28 sends a start completion signal to the power supply electronic control unit 70.

In the backup start control routine, the CPU 72 waits until reception of the start completion signal from the drive ECU 28 (step S240) and switches off the relay 27 (step S250). The CPU 72 then sets the switches SW1 through SW4 in the OFF position to cancel the parallel connection of the battery modules C1 through C3 (step S260) and subsequently sets the switches SW5 and SW6 in the ON position to connect the battery modules C1 through C3 in series (step S270). The backup start control routine is then terminated. The high-voltage battery unit 60 in the serial connection of the battery modules C1 through C3 receives the supply of electric power generated by the alternator 33. This engine start control ensures a complete start of the engine 22 even in the event that the supply of electric power from the low-voltage battery 50 fails to actuate the starter motor 26 and start the engine 22.

As described above, the power supply device 40 of the embodiment first equalizes the voltages of the respective cells included in each of the battery modules C1 through C3 in the serial connection of the battery modules C1 through C3, and then equalizes the voltages of the respective battery modules C1 through C3 in the parallel connection of the battery modules C1 through C3. This arrangement effectively reduces the power loss by the voltage equalization and thus enhances the total energy efficiency of the whole power supply device 40.

In the power supply device 40 of the embodiment, each of the battery modules C1 through C3 is designed to have the output voltage equivalent to the rated output voltage of the low-voltage battery 50. In the event that the supply of electric power from the low-voltage battery 50 fails to actuate the starter motor 26 and start the engine 22, the engine start control connects the battery modules C1 through C3 in parallel and switches on the relay 27 to actuate the starter motor 26 with the supply of electric power from the high-voltage battery unit 60 and start the engine 22. Namely multiple different power sources are selectively usable to supply the required electric power and start the engine 22. This arrangement ensures a stable start of the engine 22.

Figure 5:
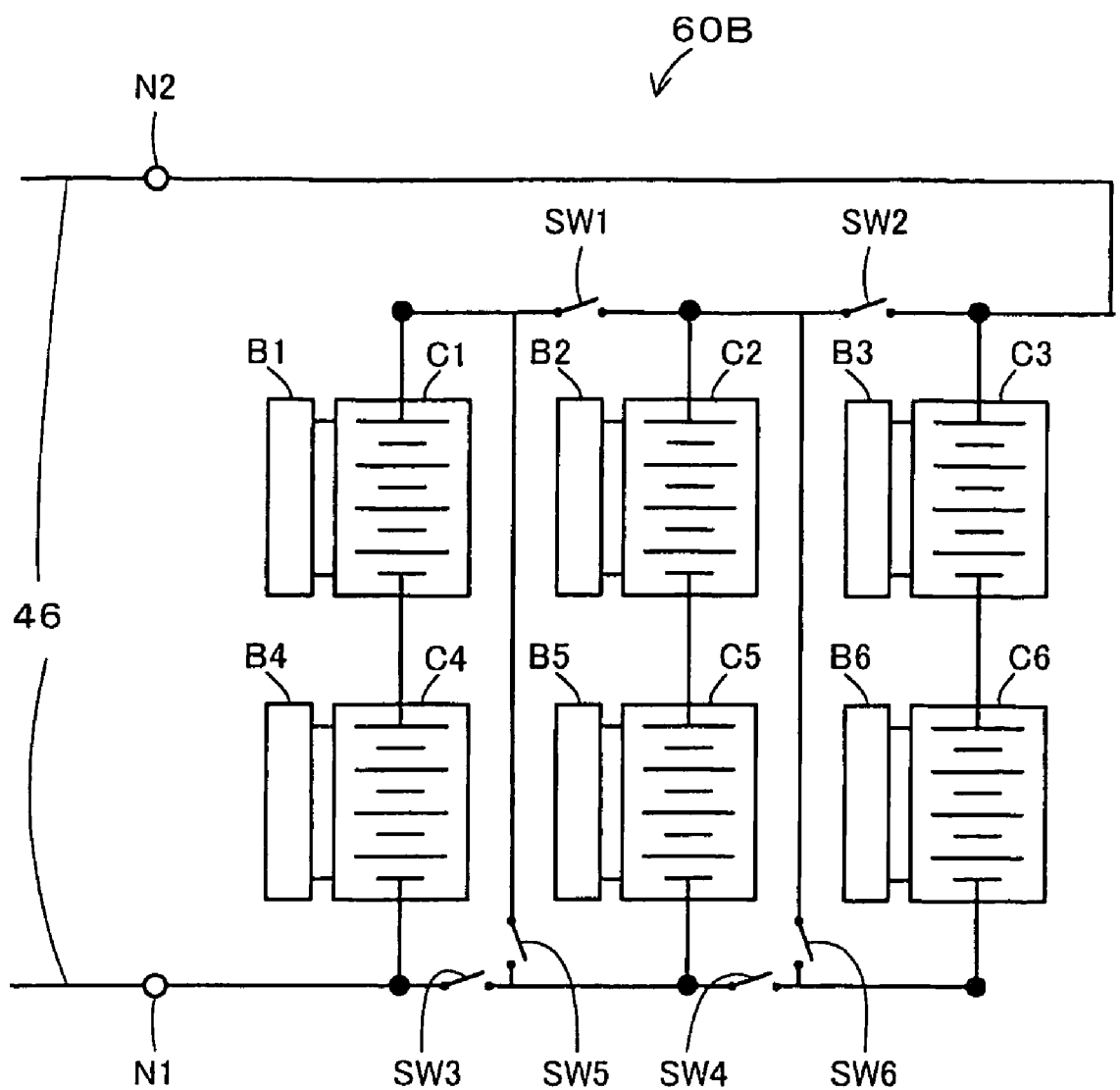
FIG. 5 schematically shows the structure of another high-voltage battery unit in one modified example.

In the power supply device 40 of the embodiment, the high-voltage battery unit 60 includes the three battery modules C1 through C3. This number of the battery modules is, however, not essential, and the high-voltage battery unit 60 may include four or more battery modules. The structure of the high-voltage battery unit 60 is not restricted to have all the battery modules connected in parallel. In one modified structure of FIG. 5, a high-voltage battery unit 60B includes six battery modules C1 through C6, where each pair of battery modules are connected in series and three battery module pairs are connected in parallel. In this modified structure, the number of battery modules connected in series is not restricted to two but may be three or more.

The power supply device 40 of the embodiment uses the alternator 33 that consumes the output power of the engine 22 and generates electric power, as the supply source of electric power. The supply source of electric power is, however, not restrictive to the alternator 33 but may be any other suitable means. The backup start control routine of FIG. 4 may not be executed unless the alternative supply source of electric power requires this engine start control.

In the power supply device 40 of the embodiment, each of the battery modules C1 through C3 in the high-voltage battery unit 60 includes plural lithium secondary cells. Each of the battery modules C1 through C3 may alternatively include plural nickel hydride cells or any other suitable cells.

The above embodiment regards the power supply device 40 mounted on the motor vehicle 20. The power supply device 40 of the embodiment may be mounted on any of diverse moving bodies including automobiles, other vehicles, ships and boats, and aircraft or may be incorporated in any of diverse stationary systems including construction equipment. In such applications, the power supply device 40 may exclude the low-voltage battery 50 but include only the high-voltage battery unit 60 and the power supply electronic control unit 70.

The embodiment discussed above is to be considered in all aspects as illustrative and not restrictive. There may be many modifications, changes, and alterations without departing from the scope or spirit of the main characteristics of the present invention.

INDUSTRIAL APPLICABILITY

The technique of the present invention is preferably applicable to the manufacturing industries of battery devices.

The invention claimed is:

1. A battery device that includes multiple battery modules, where each of the multiple battery modules has plural cells connected in series, said battery device further comprising:

multiple voltage equalization circuits that are provided corresponding to the multiple battery modules and respectively equalize voltages of the plural cells included in each of the multiple battery modules;

a connection switchover structure that switches over a connection state of the multiple battery modules between serial connection and parallel connection; and a voltage equalization control module that, upon satisfaction of a predetermined voltage equalization condition, controls the connection switchover structure and the multiple voltage equalization circuits to respectively equalize voltages of the plural cells included in each of the multiple battery modules in the state of serial connection of the multiple battery modules, and on completion of the voltage equalization of the respective cells in each of the multiple battery modules, controls the connection switchover structure and the multiple voltage equalization circuits to connect the multiple battery modules in parallel and equalize voltages of the respective battery modules.

2. A battery device in accordance with claim 1, wherein the plural cells included in each of the multiple battery modules are lithium secondary cells.

3. A battery device in accordance with claim 1, wherein the connection switchover structure switches over a connection state of plural series battery module groups between serial connection and parallel connection, where each series battery module group includes a predetermined number of the battery modules arranged in series.

4. An internal combustion engine system that includes an internal combustion engine, said internal combustion engine system further comprising:

a starter motor that cranks the internal combustion engine;

a secondary battery that supplies electric power to the starter motor;

a battery device that includes multiple battery modules, where each of the multiple battery modules has plural cells connected in series, said battery device comprising: multiple voltage equalization circuits that are provided corresponding to the multiple battery modules and respectively equalize voltages of the plural cells included in each of the multiple battery modules; a connection switchover structure that switches over a connection state of the multiple battery modules between serial connection and parallel connection; and a voltage equalization control module that, upon satisfaction of a predetermined voltage equalization condition, controls the connection switchover structure and the multiple voltage equalization circuits to respectively equalize voltages of the plural cells included in each of the multiple battery modules in the state of serial connection of the multiple battery modules, and on completion of the voltage equalization of the respective cells in each of the multiple battery modules, controls the connection switchover structure and the multiple voltage equalization circuits to connect the multiple battery modules in parallel and equalize voltages of the respective battery modules;

an electric power supply-stop changeover module that selectively permits and prohibits supply of electric power from said battery device to the starter motor; and a changeover control module that, upon satisfaction of a preset changeover condition, controls the connection switchover structure of said battery device and said electric power supply-stop changeover module to permit the supply of electric power from said battery device to the starter motor in the state of parallel connection of the multiple battery modules.

5. An internal combustion engine system in accordance with claim 4, wherein the preset changeover condition is that the secondary battery fails to supply a required electric power to the starter motor for cranking the internal combustion engine.

6. An internal combustion engine system in accordance with claim 4, wherein the plural cells included in said battery device are lithium secondary cells.

7. An internal combustion engine system in accordance with claim 4, wherein the connection switchover structure included in said battery device switches over a connection state of plural series battery module groups between serial connection and parallel connection, where each series battery module group includes a predetermined number of the battery modules arranged in series.

8. A motor vehicle equipped with an internal combustion engine as a power supply source for driving said motor vehicle, comprising;

a starter motor that cranks the internal combustion engine;

a secondary battery that supplies electric power to the starter motor;

a battery device that includes multiple battery modules, where each of the multiple battery modules has plural cells connected in series, said battery device comprising: multiple voltage equalization circuits that are provided corresponding to the multiple battery modules and respectively equalize voltages of the plural cells included in each of the multiple battery modules; a connection switchover structure that switches over a connection state of the multiple battery modules between serial connection and parallel connection; and a voltage equalization control module that, upon satisfaction of a predetermined voltage equalization condition, controls the connection switchover structure and the multiple voltage equalization circuits to respectively equalize voltages of the plural cells included in each of the multiple battery modules in the state of serial connection of the multiple battery modules, and on completion of the voltage equalization of the respective cells in each of the multiple battery modules, controls the connection switchover structure and the multiple voltage equalization circuits to connect the multiple battery modules in parallel and equalize voltages of the respective battery modules;

an electric power supply-stop changeover module that selectively permits and prohibits supply of electric power from said battery device to the starter motor; and a changeover control module that, upon satisfaction of a preset changeover condition, controls the connection switchover structure of said battery device and said electric power supply-stop changeover module to permit the supply of electric power from said battery device to the starter motor in the state of parallel connection of the multiple battery modules.

9. A motor vehicle in accordance with claim 8, wherein the preset changeover condition is that the secondary battery fails to supply a required electric power to the starter motor for cranking the internal combustion engine.

10. A motor vehicle in accordance with claim 8, wherein the plural cells included in said battery device are lithium secondary cells.

11. A motor vehicle in accordance with claim 8, wherein the connection switchover structure included in said battery device switches over a connection state of plural series battery module groups between serial connection and parallel connection, where each series battery module group includes a predetermined number of the battery modules arranged in series.

* * * * *